United States Patent [19]

Kim

[11] Patent Number: 4,849,830
[45] Date of Patent: Jul. 18, 1989

[54] PICTURE STABILIZING CIRCUIT FOR GENERATING A FORCED SYNCHRONIZING SIGNAL

[75] Inventor: Jong H. Kim, Taegu, Rep. of Korea

[73] Assignee: Gold Star Co., Ltd., Seoul, Rep. of Korea

[21] Appl. No.: 38,615

[22] Filed: Apr. 15, 1987

[30] Foreign Application Priority Data

Apr. 15, 1986 [KR] Rep. of Korea ............... 4997/1986

[51] Int. Cl.$^4$ .............................................. H04N 5/93
[52] U.S. Cl. ................................. 360/10.1; 360/10.3; 360/37.1; 358/319; 358/327
[58] Field of Search ........................ 360/9.1, 10.1–10.3, 360/33.1, 37.1; 358/310, 319, 327, 335, 337, 338, 340

[56] References Cited

U.S. PATENT DOCUMENTS

| 3,322,892 | 5/1967 | Yasuoka et al. | 360/37.1 |
| 3,517,127 | 6/1970 | Grace | 360/37.1 X |
| 3,767,849 | 10/1973 | Wessels | 360/37.1 |
| 4,203,138 | 5/1980 | Elenbaas | 360/37.1 |
| 4,489,352 | 12/1984 | Kobayashi et al. | 360/10.3 |
| 4,509,082 | 4/1985 | Kroner | 360/37.1 X |
| 4,733,312 | 3/1988 | Morimoto | 360/10.1 |
| 4,737,864 | 4/1988 | Sekiya et al. | 360/10.1 X |

FOREIGN PATENT DOCUMENTS 54-98520 8/1979 Japan ................................. 360/37.1

Primary Examiner—Aristotelis M. Psitos
Assistant Examiner—W. R. Young
Attorney, Agent, or Firm—Birch, Stewart, Kolasch & Birch

[57] ABSTRACT

When a speed change occurs during a reproduction mode of a VCR, an analog video signal is developed that has a width determined by synchronizing the analog video signal to a point in time when an electrical potential for the head switching signal is shifted. The analog video signal is applied as a compensating signal to video signals so that a rising level is compensated for near a forced synchronizing signal. Thereby, a condition is provided for the forced synchronizing signal to be reliably detected without being effected by noise signals corresponding to the forced synchronizing signal in order to produce a stable picture.

1 Claim, 2 Drawing Sheets

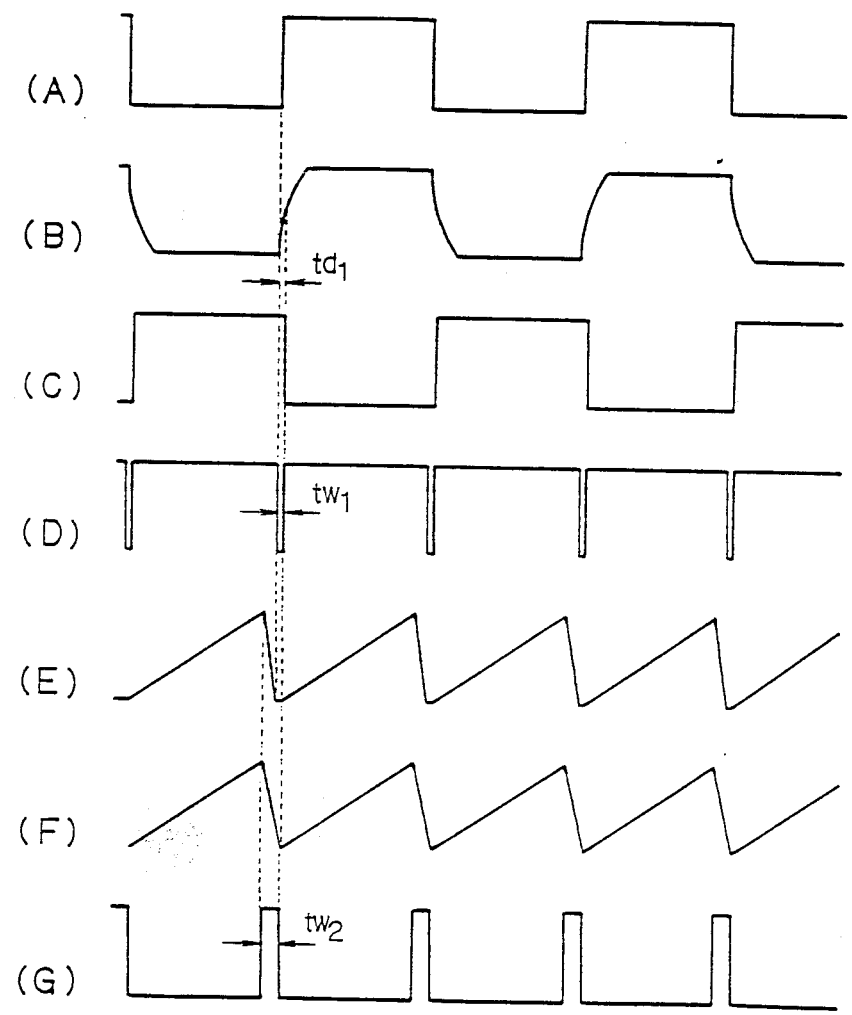
FIG, 2

PICTURE STABILIZING CIRCUIT FOR GENERATING A FORCED SYNCHRONIZING SIGNAL

BACKGROUND OF THE INVENTION

This invention relates to a picture stablizing circuit for a video cassette recorder (hereinafter referred to as "VCR"). In particular, a picture stablizing circuit is designed for preventing instability caused by noise when a speed change occurs during a reproduction mode of the VCR.

In general, noise is produced when a speed change occurs during the reproduction mode of the VCR. If the noise corresponds to a synchronizing signal portion of the video signal, then the noise rapidly moves the picture in a vertical direction to the picture or vibrates the picture so that an unstable picture is produced.

In order to correct the unstable picture caused by the speed change during the reproduction mode of the VCR, the picture may be manipulated by the tracking adjustment unit that is mounted on the exterior of the VCR. By manipulating the tacking adjustment unit, the scanning position of the video head is adjusted so that the noise is not superposed on the synchronizing signal portion. However, if the reproduction mode is normally repeated, or if the speed changing direction is shifted, then the picture must be stabilized by repeating the manipulation of the tracking adjustment unit, which is complex and troublesome. This manipulation causes the vertical synchronizing signal to be lost and the picture to become unstable. Previously, a stable picture had been developed when the speed change during the reproduction mode produces a forced synchronizing signal synchronized to the head switching signal when the speed change occurs during the reproduction mode of the VCR. A vertical synchronizing portion of the video signal is produced by applying the forced synchronizing signal to the video signals. According to this conventional device, problems remain when noise is produced at the beginning of the forced synchonizing signals, and noise signals are treated similar to forced or vertical synchronizing signals. Consequently, the picture will temporarily shake or collapse and a substantially stable picture is impossible to produce.

SUMMARY OF THE INVENTION

The embodiments of this invention are proposed for solving such conventional disadvantages as described above and aims to provide a stable picture by reliably detecting the forced synchronizing signal when a speed change occurs during a reproduction mode of the VCR so that noise signals do not effect the picture.

According to these embodiments, this problem is solved by producing an analogue video signal that is developed by synchronizing the head switching signal when the speed change occurs during the reproduction mode. This analogue video signal is applied to the video signals so that the noise signal is increased around the forced synchronizing signal corresponding to the white level of the picture.

BRIEF DESCRIPTION OF THE DRAWINGS

The embodiments of the invention will now be described in more detail, by way of example, with reference to the accompanying drawings. The drawings are provided for illustration purposes only and thus are not limitative of the embodiments of the invention, wherein:

FIG. 2 (A–G) is a view of the output wave forms for elements in FIG. 1.

DESCRIPTION OF THE PREFERRED EMBODIMENT

Figure 1:
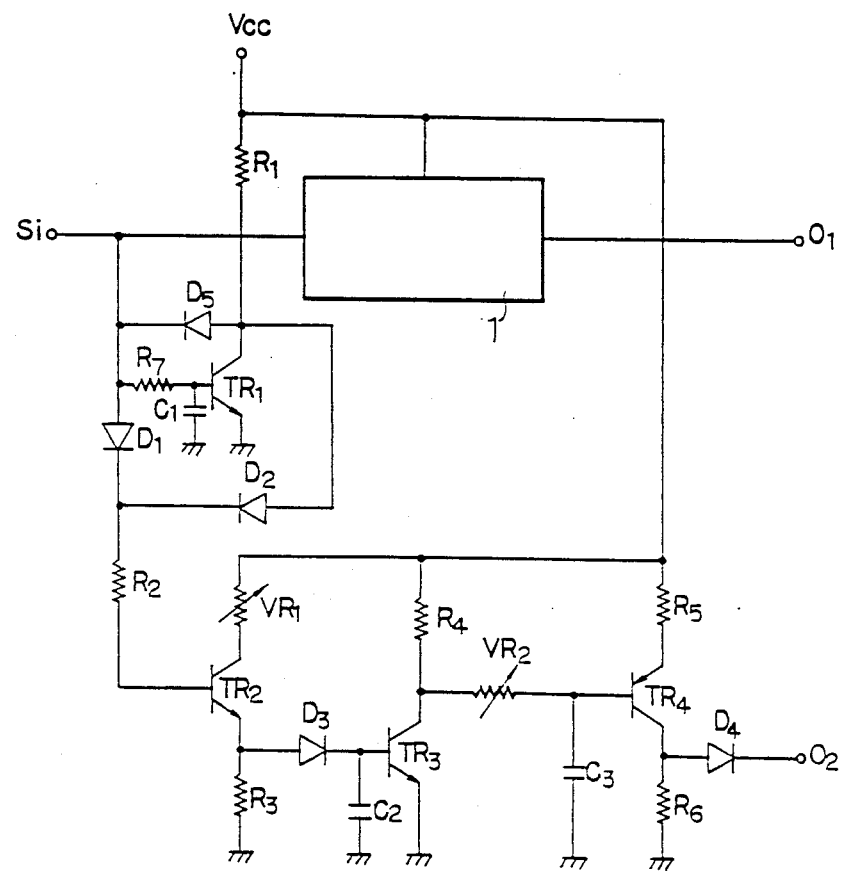
FIG. 1 is a diagram of a picture stabilizing circuit for an embodiment of the invention.

In FIG. 1, a picture stabilizing circuit diagram for an embodiment of the invention is shown. In the circuit, a forced synchronizing signal is generated by the forced synchronizing signal generating section 1 which synchronizes the head switching signal. The forced synchronizing signal is transmitted to the input of the head switching signal and is also transmitted to the input of the head switching signal input terminal Si when a speed change occurs during the reproduction mode. The forced synchronizing signal is transmitted to the output of the forced synchronizing signal output terminal $O_1$. The head switching signal input terminal Si and a diode $D_5$ that is connected to the collector of a transistor $TR_1$ are both connected to the base of the transistor $TR_1$ and a capacitor $C_1$ through a resistor $R_7$.

Similarly, the head switching signal input terminal Si and the collector of the transistor $TR_1$ are connected jointly through diodes $D_1$ and $D_2$, respectively. The junction of the diodes $D_1$ and $D_2$ is connected to the base of a transistor $TR_2$ through a resistor $R_2$. The base of a transistor $TR_3$ is connected to a ground capacitor $C_2$ and the base emitter of the transistor $TR_2$ is connected to the ground capacitor $C_w$ through a ground resistor $R_3$ and a diode $D_3$. The base of a transistor $TR_4$ is connected to a ground capacitor $C_3$ and the collector of the transistor $TR_3$ is connected to the ground capacitor $C_3$ through a variable resistance $VR_2$. The collector of the transistor $TR_4$ is connected to a compensating signal output terminal $O_2$ through a ground resistor $R_6$ and a diode $D_4$.

Furthermore, the collectors of transistors $TR_1$, $TR_2$ and $TR_3$ and the emitter of transistor $TR_4$ are connected to a power terminal Vcc through resistors $R_1$, $VR_1$, $R_4$, $R_5$, respectively. Thereby, a head switching signal of 30 Hz is transmitted to the head switching signal input terminal Si, and a high electrical potential is applied to the power terminal Vcc when a speed change occurs in the reproduction mode.

The operation effect of the above-mentioned embodiment of the invention will now be described in more detail with reference to the waveforms shown in FIG. 2.

When a speed change occurs during the reproduction mode of the VCR, the high electrical potential is applied to the power terminal so that the forced synchronizing signal generating section 1 is in an operating condition. In coincidence, a head switching signal of 30 Hz is transmitted to the head switching signal input terminal Si, as shown in FIG. 2(A) the forced synchronizing signal generating section 1 generates a forced synchronizing signal by synchronizing the head switching signal. The forced synchronizing signal is transmitted to the output of the forced synchronizing signal output terminal $O_1$, and produces the vertical synchronizing portion of the video signal.

At this time, the head switching signal of 30 Hz is applied to the base of transistor $TR_1$. A delay wave, as shown in FIG. 2(B) is generated by the resistor $R_7$ and the capacitor $C_1$. Therefore, the delay time $td_1$ is determined by the charage and discharge time constant of the resistor $R_7$ and the capacitor $C_1$.

Thus, a waveform signal as shown in FIG. 2(C) is output from the collector of the transistor $TR_1$. This waveform signal and the head switching signal are applied to the base of the transistor $TR_2$ through the resistor $R_2$. After combining the signals as shown in FIG. 2(D), through diodes $D_2$ and $D_1$, respectively, the transistor $TR_2$ is cut off during a time $tw_1$ when the low electrical potential is applied to the base of the transistor $TR_2$, and a charge to the capacitor $C_2$ is thereby interrupted.

Conversely, when the charging voltage for the capacitor passes through the transistor $TR_3$ before such an interruption takes place, a charging voltage is discharged through the transistor $TR_3$, and the waveform signal as shown in FIG. 2(E) is applied to the base of the transistor $TR_2$. The cycle of this waveform signal is regulated according to the value of the variable resistance $VR_1$. At this time, the transistor $TR_3$ is in an off state, and the charging current flows to the capacitor $C_3$ through the resistor $R_4$ and the variable resistor $VR_2$, so that the capacitor $C_3$ is charged. When the transistor $TR_e$ is in an on state, the charging voltage of the capacitor $C_e$ is discharged through the variable resistor $VR_2$ and the transistor $TR_3$ so that the waveform signal as shown in FIG. 2(F) is applied to the base of the transistor $TR_4$. Since the transistor $TR_4$ is only in the on state when a low potential signal is applied to the base of transistor $TR_4$, a waveform signal of a definite width $tw_2$ as shown in FIG. 2(G) is output to the collector of the transistor $TR_4$.

Thus, a waveform signal of the definite width $tw_2$ is output to the collector of the transistor $TR_4$ near every point in time when the potential to head switching signal is shifted, and the width $tw_2$ of such a waveform signal is regulated by the value of variable resistors $VR_1$ and $VR_2$. Since the generated waveform signal is transmitted to the output of the compensating signal output terminal $O_2$ through the diode $D_4$ and the generated waveform signal is applied to the video signals, the levels near the forced synchronizing signal of the video signals are compensated so that the white level of the picture rises. Consequently, the detection of the forced synchronizing signal during a speed change of the reproduction mode may be accurately detected.

As described above in detail, an embodiment of the invention compensates for the level near the forced synchronizing signal of the video signals so that the white level rises when a speed change occurs during the reproduction mode. Thereby, the device is capable of reliably detecting the forced synchronizing signal without being effected by noise signals, and a stable picture condition may be obtained. Therefore, it is unnecessary to adjust a tracking unit for stabilizing the picture when a speed change occurs during the reproduction mode.

While only certain embodiments of the present invention have been described, it will be apparent to those skilled in the art that various changes and modifications may be made therein without departing from the spirit and scope of the present invention as claimed.

What is claimed is:

1. A picture stablizing apparatus comprising:
   forced synchronizing signal generating means for generating a forced synchronizing signal in response to a head switching signal when a speed change occurs during a reproduction mode of a video cassette recorder and for applying said forced synchronizing signal to video signals; and
   compensating signal generating means for applying said head switching signal to a first capacitor and the base of a first transistor through a first resistor, said head switching signal and a collector output signal from said first transistor being applied to the base of a second transistor through first and second diodes, respectively, an emitter output signal from said second transistor being applied to a second capacitor and the base of a third transistor through a first ground resistor and a third diode, a collector output signal from said third transistor being applied to a third capacitor and the base of a fourth transistor through a variable resistor and a collector output signal from said fourth transistor being applied to said video signals as a compensating signal through a second ground resistor and a fourth diode.

* * * * *